United States Patent [19]
Rat et al.

[11] 3,970,511
[45] July 20, 1976

[54] PROCESS AND INSTALLATION FOR CONCENTRATING DILUTE SOLUTIONS OF CORROSIVE PRODUCTS

[75] Inventors: Roger M. Rat, Saint-Medard-en-Jalles; Francois A. Pollozec, Bergerac; Jean J. Patouillet, Paris, all of France

[73] Assignee: Societe Nationale des Poudres et Explosifs, Antar Petroles de l'Atlantique: Antargaz, France

[22] Filed: Dec. 18, 1973

[21] Appl. No.: 425,922

[30] Foreign Application Priority Data
Dec. 19, 1972 France .............................. 72.45228

[52] U.S. Cl. ................................. 159/13 C; 159/29; 159/49; 159/16 A; 159/DIG. 6; 159/DIG. 15; 159/DIG. 19; 23/275; 23/307; 423/529; 423/531
[51] Int. Cl.² ...................... B01D 1/14; B01D 1/22; B01D 1/02; C01B 17/90
[58] Field of Search ................ 159/15, 18, 29, 13 C, 159/D6, D15, D19, 49; 23/274, 275, 276, 306, 307; 423/529, 522, 531; 202/234; 203/100, 100 DC

[56] References Cited
UNITED STATES PATENTS

| | | | |
|---|---|---|---|
| 339,552 | 4/1886 | Hughes ............................ 159/29 X |
| 548,303 | 10/1895 | Dyson .................................... 23/274 |
| 573,219 | 12/1896 | Haubtman ........................ 159/13 C |
| 699,011 | 4/1902 | Quinan ................................. 23/275 |
| 1,263,950 | 4/1918 | Slater ............................. 159/17 US |
| 2,486,684 | 11/1949 | Schlesman et al. ............ 159/15 UX |
| 2,527,410 | 10/1950 | Fleischer ............................. 122/356 |
| 2,620,573 | 12/1952 | McMahon ...................... 159/DIG. 6 |
| 3,221,711 | 12/1965 | Beggs ............................. 122/356 X |
| 3,294,650 | 12/1966 | Manteufel .................... 159/DIG. 15 |
| 3,353,920 | 11/1967 | Kitzen .............................. 122/356 X |

*Primary Examiner*—Jack Sofer
*Attorney, Agent, or Firm*—Bucknam and Archer

[57] ABSTRACT

Dilute solutions of corrosive products, such as sulphuric or phosphoric acid, are concentrated by pre-concentrating the dilute solution and then introducing the pre-concentrated solution into a tunnel in which it flows in a thin layer over successive cascades while being heated, preferably by indirect radiant heating. An installation for carrying out the process is also described.

19 Claims, 5 Drawing Figures

PROCESS AND INSTALLATION FOR CONCENTRATING DILUTE SOLUTIONS OF CORROSIVE PRODUCTS

The present invention relates to a process and apparatus for concentrating dilute solutions of corrosive products, such as acids, by heating.

The problem of concentrating corrosive products arises more and more frequently since in order to avoid effluents containing such products being discarded, and thus causing pollution, consideration is given to their treatment in order to recycle them.

This applies particularly to acids, such as sulphuric acid and phosphoric acid, which are used in a large number of industrial installations and which are discharged from these installations either diluted with water or polluted by other chemical compounds. Such used acids require to be purified and reconcentrated in order that they can be re-used. The acid for which this concentration problem arises most frequently in industry is sulphuric acid which is very widely used, usually as concentrated sulphuric acid, as a sulphonation reagent, as a catalyst or as a dehydrating agent.

Installations are known in which a dilute solution of sulphuric acid is concentrated in a tower filled with a packing, such as a Gaillard tower, the sulphuric acid solution flowing down the tower in countercurrent to ascending hot gas. In this process, the hot gas carries the volatile constituents of the sulphuric acid solution away with it and concentrated acid is recovered at the foot of the tower. It has been found, however, that when the sulphuric acid concentration reaches approximately 85%, partial thermal decomposition of the concentrated sulphuric acid takes place, with formation of sulphur trioxide which is removed from the tower by the hot gas. The result of this partial thermal decomposition is a considerable decrease in the yield of concentrated sulphuric acid.

It has been proposed to overcome this disadvantage by carrying out a pre-concentration of dilute sulphuric acid solution in such a tower to a maximum of 85%, and then to complete the concentration in a boiler provided downstream of the tower in relation to the direction of flow of the sulphuric acid. Such an installation enables an acid concentration of 96% to be obtained, but only partially prevents the acid vapours formed in the boiler from being carried away by the gas. In fact, the delayed boiling of the pre-concentrated solution in the boiler causes large amounts of acid vapours to be carried away and also causes severe vibrations. In addition, such installations have only a low heat yield.

We have now developed a process and installation for concentrating dilute solutions of sulphuric acid and other corrosive products which enable concentrated solutions to be obtained in excellent yields with respect to the starting material and the heat required.

According to the present invention, we provide a process for concentrating a dilute solution of a corrosive product by heating, which comprises pre-concentrating the dilute solution and then introducing the pre-concentrated solution into a tunnel in which it flows in a thin layer over successive cascades while being heated in order to obtain the desired final degree of concentration.

By making the solution flow over successive cascades in a thin layer, a large surface area of contact is provided between the solution and the heating means, and this promotes heat exchange. This arrangement also enables the above-mentioned delayed boiling effect to be eliminated.

The solution is preferably heated by burning a gas mixture inside a material with a high radiating power located outside or inside the tunnel, allowing a high regularity and uniformity of heating.

When the solution is heated by means located outside the tunnel, it is impossible for the vapours given off by the solution during concentration, to be diluted with the combustion gases or with air. This dilution can also be avoided when the heating means are placed inside the tunnel, by positioning a sheet of silica between the heating means and the solution. The latter arrangement limits the risk of concentrated corrosive products being carried away, by making it possible to work very close to the liquid-vapour equilibrium without in any way restricting the passage of the radiation, silica being transparent to infra-red rays.

The dilute solution is pre-concentrated in the tower by means of direct contact between the combustion gases produced and/or the vapours evolved from the solution in the tunnel; in this way the heat yield of the process is increased.

The dilute solution is pre-concentrated in the tower being pre-concentrated, in a heat exchanger by recovering heat from the product obtained when concentration is complete and/or from the vapours evolved from the solution in the tunnel; this also considerably increases the heat yield of the process.

The present invention also comprises an installation for concentrating a dilute solution of a corrosive product by heating, which comprises a preconcentration apparatus and, connected in series therewith, apparatus for completing the concentration of the pre-concentrated solution, which comprises a tunnel made from a material which is a good conductor of heat and is resistant to corrosion, and providing successive cascades over which the solution can flow in a thin layer, and means for heating solution flowing through the tunnel.

Such an installation may also comprise means for extracting the vapours evolved in the tunnel, such means being located at one or more positions in the tunnel. This is particularly valuable in the case where the vapours contain pollutant or corrosive products.

In order to increase the heat yield of the installation, the means for heating the solution flowing in the tunnel preferably consist of a row of juxtaposed radiant burners made from a refractory material with a high radiating power, these burners being positioned above the surface of the tunnel over which the solution is adapted to flow or below and outside the tunnel, and the radiant burners are associated with control means for adjusting the rate of flow of gas therethrough. It has, as a matter of fact, been observed that only the regularity and uniformity of heating provided by the use of radiant burners permits not to overstep the thermal shock resistance of the material constituting the cascade.

In general terms, the invention relates to the concentration of dilute solutions of corrosive products which require a large amount of heat to be supplied in order to concentrate them. In the following description, we will particularly refer to the concentration of sulphuric acid solutions, but it should be understood that the invention is equally applicable to solutions of phosphoric acid or any other corrosive product, which solutions fulfill the above-mentioned characteristic.

In order that the invention may be more fully understood, preferred embodiments of installation according to the invention, and the operation thereof to concentrate a dilute sulphuric acid solution, will now be described, by way of example, with reference to the accompanying drawings, in which.

Figure 4:
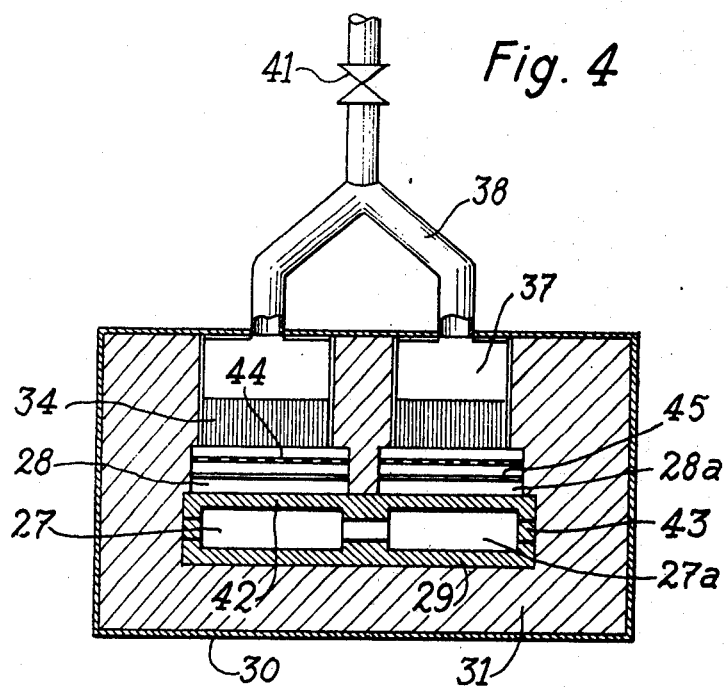
Figure 5:
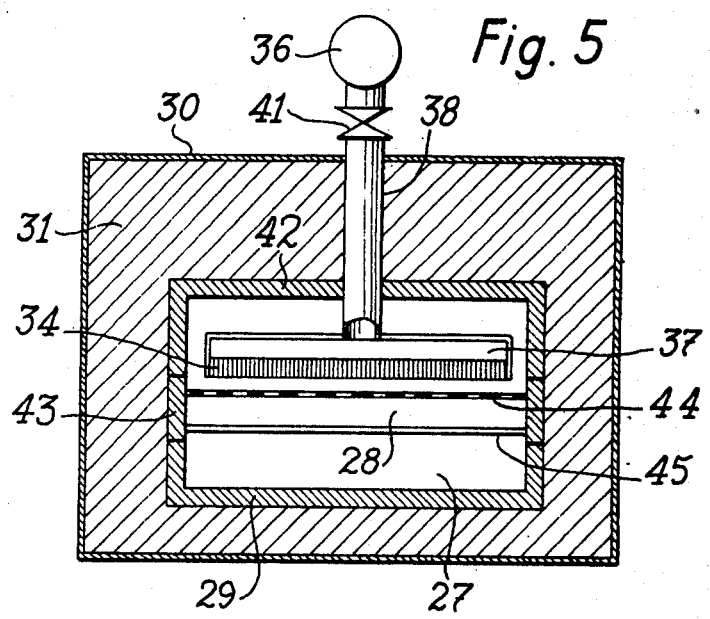

FIG. 4 illustrates the embodiment according to which the burners are located on the outside and above the tunnel. FIG. 5 illustrates the embodiment according to which the burners are located inside the tunnel and above the solution. When the burners are on the outside, one tunnel is the drying tunnel and another tunnel is where the burners are located.

Figure 1:
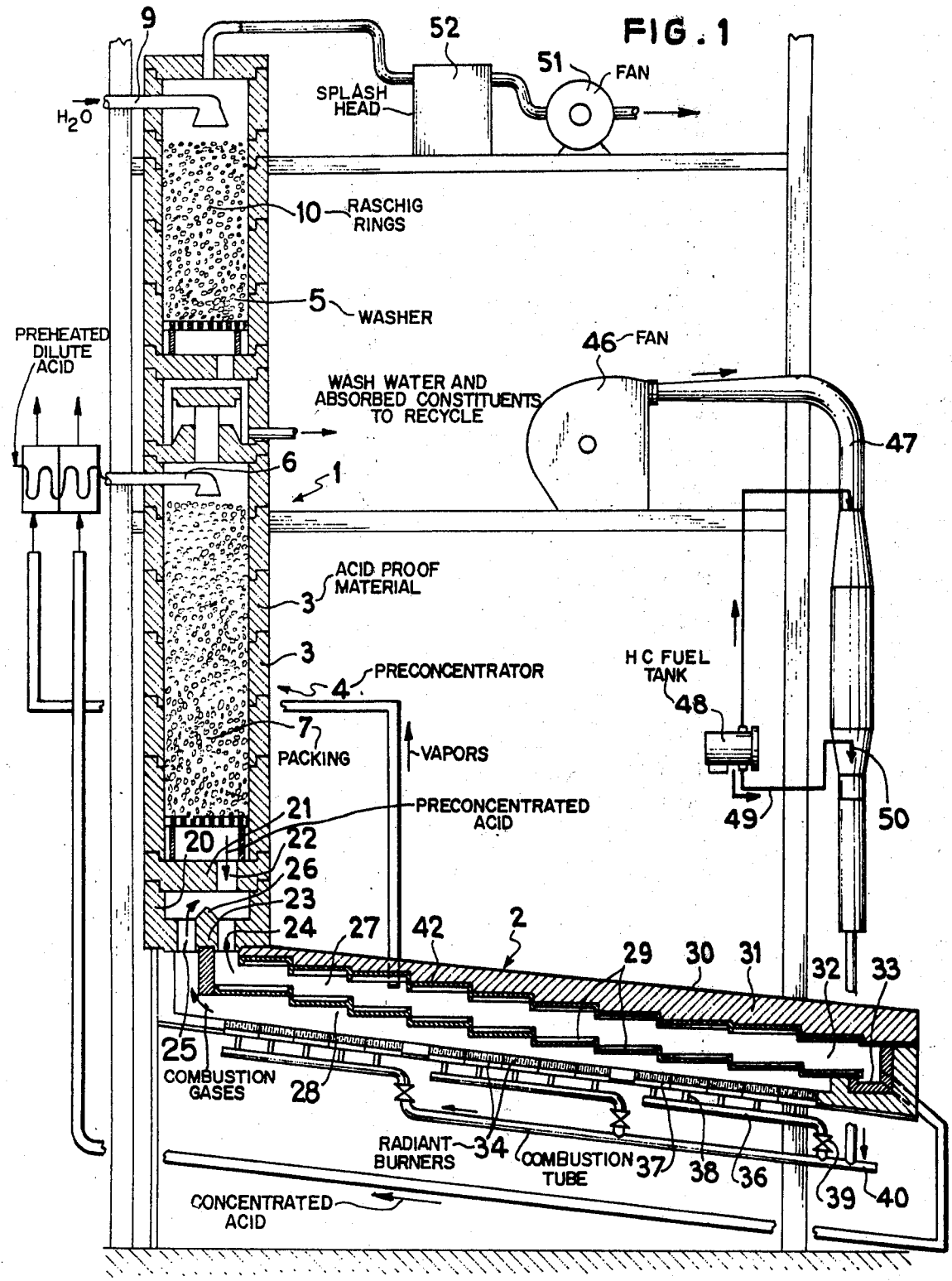
FIG. 1 is a diagrammatic elevation, partly in vertical section, of an installation according to the invention with certain details of the apparatus for completing the concentration omitted for the sake of clarity.

Referring to FIG. 1, the installation comprises a tower generally indicated at 1 for effecting pre-concentration and washing of the dilute starting solution, to which is connected, in series, apparatus for effecting completion of the concentration, generally indicated at 2.

The pre-concentration and washing tower 1 consists of superposed elements 3 made from a material which is not attacked by sulphuric acid, such as natural silica or Volvic lava. The tower 1 comprises a lower section 4 for pre-concentrating the sulphuric acid solution, and an upper section 5 for washing the vapours.

At the top of the lower section 4, there is provided an inlet tube 6 for the dilute solution of sulphuric acid. The lower section 4 is filled with internal packing 7 consisting of granules of natural silica to provide a large surface area of contact between the sulphuric acid solution which flows towards the bottom of the tower and an ascending hot gas mixture.

At the top of the upper section 5, there is provided an inlet tube 9 for cold water. The upper section 5 contains internal packing 10 consisting of stoneware Raschig rings.

The lower section 4 of the tower 1 is provided, at its base, with a compartment 20, which serves to direct the pre-concentrated solution to the apparatus 2 for completion of concentration and to direct ascending hot gases towards the pre-concentration section 4. For this purpose, the compartment 20 comprises an upper wall 21 having an orifice 22 which allows the sulphuric acid solution to enter the compartment 20 and allows the hot gases to rise. The lower wall 23 of the compartment contains two separate orifices 24 and 25, one of which, 24, is positioned substantially opposite the orifice 22, thus forming the orifice for introducing the sulphuric acid solution into the apparatus 2, the other, 25, being the orifice for introducing the hot gases into the compartment 20. A fixed divider 26 between the two orifices 24 and 25 in the lower wall prevents the sulphuric acid solution from passing through the orifice 25 which is reserved for the passage of the hot gases.

As will be seen from FIG. 1, the apparatus 2 for completing the concentration of the pre-concentrated solution coming from section 4 of the tower 1, comprises two superposed tunnels 27 and 28 separated by a row of trays 29 made from a material which is a good conductor of heat and is resistant to corrosion, the trays being arranged in a descending series so that the solution flows over them in a thin layer and successively cascades from one to the next. The two tunnels 27 and 28 are enclosed in a refractory material 31, such as bricks or concrete, and the latter, in turn, in a metal case 30.

At the lower end of the upper tunnel 27, there is a transverse channel 33 for recovering the concentrated sulphuric acid.

The lower wall of the tunnel 28 consists of radiant burners 34 with a high radiating power and a controllable output. They are made of a refractory ceramic material perforated with a plurality of microchannels 35 (see FIG. 2) forming as many micro-burners, which are supplied with gas through a tube 36; the gas is supplied to chambers 37 located under each burner 34 through the secondary tubes 38 which open into each chamber 37.

Above the face of the radiant burners 34, there is provided an anti-convection metal grid 44 (see FIGS. 2 and 3; not shown in FIG. 1 for clarity) which enables their radiating power and their coefficient of emissivity to be greatly increased and higher heat outputs to be obtained. The emission spectrum of the radiation from these burners lies for the most part between the red and infra-red wavelengths which promote heating.

Suitable burners of the kind described are, for example, those designed and manufactured by ANTAR-GAZ, of Paris, France. Such burners are described particularly in French Pat. Nos. 1,110,164, 1,283,179 and 1,482,653 and in French patent application No. 72/16,388.

Means are provided for supplying a group of radiant burners 34 or each burner 34 with a combustible gas mixture at an adjustable flow rate.

For example, in the embodiment of FIG. 1, three groups of five burners 34 are supplied at an adjustable flow rate by means of the 3 flow rate control valves 39 mounted on the tubes 36 downstream from a main gas supply tube 40.

Figure 2:
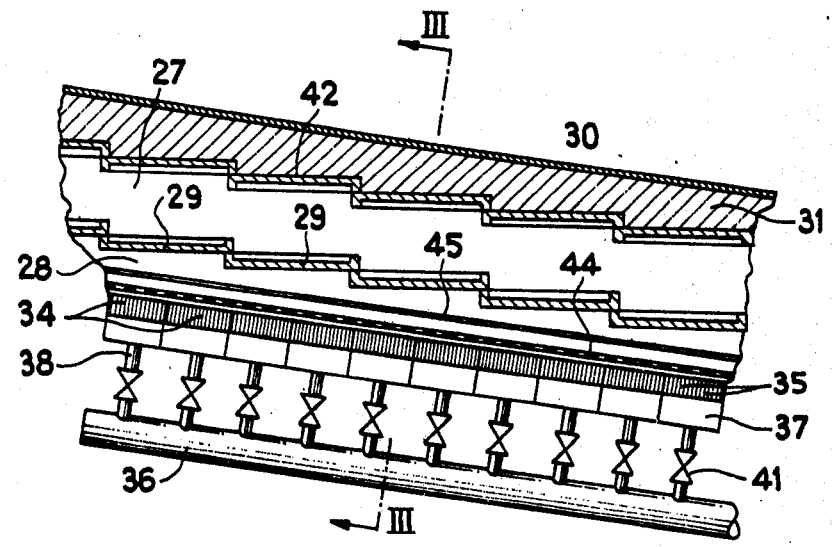
FIG. 2 is a vertical section on an enlarged scale of part of another apparatus for completing the concentration of the solution.

In FIG. 2, it is seen that each burner 34 is supplied individually at an adjustable flow rate by means of the valves 41 mounted on the tubes 38.

The trays 29 are made from a material which is suitable for the installation, which is resistant to corrosion under the operating conditions and is resistant to thermoshock, and is a good conductor of heat. In the case of sulphuric acid, good results are obtained with silicon carbide materials, such as that available under the trade mark "Crystolon".

All the walls of the upper tunnel 27 are preferably made from this material. Thus the upper wall of the tunnel 27 consists of inverted trays 42 made of "Crystolon", whilst the side walls are made of plates 43 of "Crystolon", as shown in FIG. 3.

Other materials such as tantalum, niobium, silica glass or some ceramics such as that available under the trade mark "Pyroflam" can also be used instead of "Crystolon".

Figure 3:
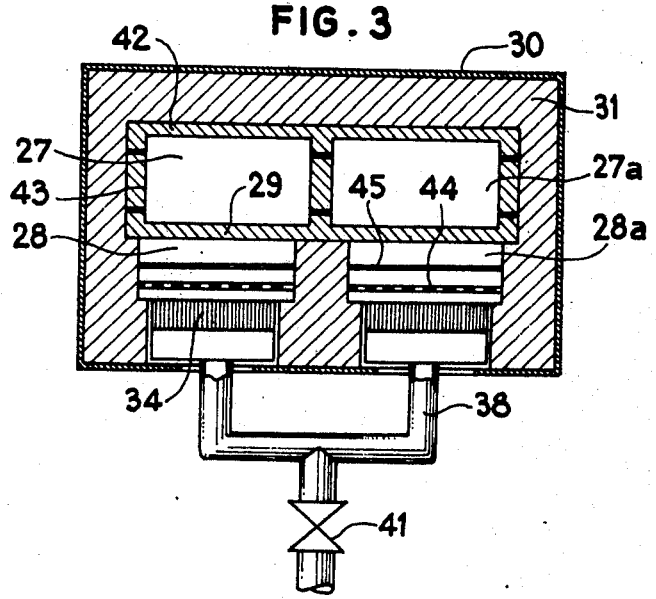
FIG. 3 is a section on line III—III of FIG. 2.

As also shown in FIG. 3, the apparatus 2 comprises two juxtaposed under tunnels 27 and 27a for the flow of the sulphuric acid solution, positioned above two lower tunnels 28 and 28a, each containing a row of radiant burners 34 comprising a material with a high radiating power.

Inside the lower tunnels 28 and 28a, between the trays 29 and the burners 34, a sheet of silica is provided, on which the sulphuric acid can evaporate in the case of possible leakage; possible damage to the burners 34 is thus avoided.

Where the heating means are positioned inside the upper tunnel 27, a sheet of silica is provided between the burners and the trays 29.

In both cases, the purpose of the sheet of silica is to separate the combustion gases from the vapours given off by the solution thus preventing these vapours from being diluted and enabling the two gas flows to be recovered separately for possible separate treatments.

The arrangement with the burners inside the upper tunnel is, however, only suitable for achieving sulphuric acid concentrations of less than 85%, or in those zones of the installation where the concentration is less than 85%. At concentrations above 85%, there is a risk, with this arrangement, of increasing acid losses, in the form of white vapours, and of thus reducing the yield of the process.

The installation which has just been described can also comprise means for extracting the vapours formed by heating the solution in the tunnel. The vapours thus removed can be used in a heat exchanger in order to preheat the dilute solution of acid, before pre-concentration. Such means can consist of one or more tubes (not shown) opening into the tunnel 27 above the trays 29.

Such removal of the vapours formed in the tunnel 27 is particularly desirable when the vapours contain pollutant and/or corrosive products.

The way in which the installation shown in FIG. 1 or FIGS. 2 and 3 is operated will now be described in detail.

The dilute solution of sulphuric acid, optionally preheated in a heat exchanger by recovering heat from the sulphuric acid obtained when concentration is complete and/or from the vapours arising from the concentration, is introduced via the tube 6 into the preconcentration section 4 of the tower 1.

This solution flows towards the bottom of the tower between the granules of natural silica forming the packing 7.

At the same time, a combustible gas mixture is supplied to the radiant burners 34 and is burnt in the micro-channels 35 of the burners.

The combustible gas mixture can, for example, be a mixture of air and hydrocarbon vapour. This mixture is, in a preferred embodiment of the installation, produced by means of an electric fan 46 which passes air under pressure through a pipeline 47. Liquid hydrocarbon fuel held in a tank 48 is passed to the pipeline 47 via a tube 49, the end 50 of which is provided with a calibrated orifice and is situated at the same level as the fuel in the tank 48. The fuel is vaporised as it issues from the calibrated orifice of the end 50 of the tube 49 because of the reduction in pressure created by the flow of air through the pipeline 47. The mixture of fuel vapour and air thus produced is passed to the burners 34 via the tubes 40, 36 and 38.

The combustion gases produced by the combustion of the gas mixture in the micro-channels pass towards the compartment 20, and through the orifices 25 and 22, to the pre-concentration section 4. The combustion gases pass upwardly in counter-current to the sulphuric acid solution which flows downwardly through the section 4.

Due to the packing 7 in the section 4, there is a large surface area of contact between the ascending combustion gases and the sulphuric acid solution. The absorption of the heat of the combustion gases by the sulphuric acid solution effects pre-concentration of the latter before entering the apparatus 2. The process should, however, be carried out under conditions of temperature and flow rate such that the sulphuric acid solution is not concentrated to more than 85% in the pre-concentration section 4, in order to prevent thermo-decomposition of the sulphuric acid with formation of sulphur trioxide.

The ascending combustion gases, carrying with them the volatile constituents of the sulphuric acid solution, then enter the washing section 5.

In section 5, the combustion gases are washed with cold water introduced via the tube 9, which absorbs the constituents of the gases which are soluble in or can be absorbed by water. The wash waters formed are removed to the outside at the bottom of section 5 and can be recycled for re-use up to a maximum concentration.

The washed mixture of combustion gases and vapours is passed through a splash head apparatus 52 before passing through the fan 51. The fan 51 is designed to produce a reduction in pressure at the top of the washing tower so as to prevent air from entering the installation, to overcome pressure drops and to have zero reduction in pressure at the point at the end of the tunnel 27 where the concentrated acid is discharged.

After pre-concentration in the section 4, the sulphuric acid solution is introduced into the tunnel 27 in order to complete concentration of it to the desired value. As already indicated, the sulphuric acid solution flows through the tunnel 27 in a thin layer and in successive cascades over the series of trays 29.

As it flows through the tunnel 27, the sulphuric acid solution is concentrated by heating the trays 29 by means of the radiation emitted by the radiant burners 34. The radiant heat evolved by the burners 34 is adjusted by varying the flow rate of the combustible mixture thereto so that the temperature of the sulphuric acid on the last tray 29 is equal to the boiling point of sulphuric acid of the desired concentration.

It is also advantageous to vary the flow rates of the combustible mixture to each burner so as to produce different degrees of heat exchange between the burners 34 and the sulphuric acid solution relative to the direction of flow of the latter. Thus, the first tray 29 may be heated more strongly than the last trays, because the first trays contain a more dilute sulphuric acid solution than the last trays. The efficiency of distillation will consequently be at a maximum in the first tanks where a large amount of water can be evaporated.

It will be appreciated that the invention is not limited to the embodiments which have been described and numerous variants may be introduced within the scope of the invention.

In particular, the number of trays arranged in a descending series can be varied depending on the rate at which the solution to be concentrated is supplied and depending on the initial concentration of the latter.

Likewise, the number of burners, as well as the means by which they are supplied with the combustible gas mixture can be adapted to the various uses and operating characteristics of the installation.

What is claimed is:

1. A process for concentrating a dilute solution of a corrosive product by heating, which comprises the steps of
   1. pre-concentrating the dilute solution, and
   2. introducing the pre-concentrated solution into a tunnel in which it flows in a thin layer over successive cascades while being heated whereby the desired final degree of concentration is obtained, and generating the required heat by burning a combustible gas mixture inside a burner material with a high radiating power located sufficiently close to said tunnel in which the solution flows to heat said solution and volatile materials are vaporized while being isolated from the combustion gases.

2. A process according to claim 1, wherein said dilute solution is pre-heated, before being pre-concentrated, by indirect heat exchange with the final concentrated solution.

3. A process according to claim 1, wherein said dilute solution is pre-heated, before being pre-concentrated, by indirect heat exchange with the vapours evolved from the solution in said tunnel.

4. A process according to claim 1, wherein said pre-concentrated solution is subjected to different degrees of heating along said tunnel.

5. The process according to claim 1 wherein the solution is a dilute solution of sulfuric acid which is concentrated to not in excess of 85% in said step (1).

6. A process according to claim 1, wherein said pre-concentrated solution is heated in said tunnel by burning a gas mixture inside a burner material with a high radiating power located above and outside of said tunnel.

7. A process according to claim 1, wherein said pre-concentrated solution is heated in said tunnel by burning a gas mixture inside a material with a high radiating power located below and outside of said tunnel.

8. A process according to claim 1, wherein said pre-concentrated solution is heated by burning a gas mixture inside a material with a high radiating power located inside said tunnel and above said solution.

9. A process according to claim 7, wherein said dilute solution is pre-concentrated by direct contact with the combustion gases produced.

10. A process according to claim 7, in which said dilute solution is pre-concentrated by direct contact with the vapours evolved from the solution in said tunnel.

11. An apparatus for concentrating a dilute solution of a corrosive product by heating, which comprises
   1. first means for pre-concentration of said solution
   2. second means for completing the concentration of the pre-concentrated solution, connected in series with said first means, which second means comprises a tunnel made from a material which is a good conductor of heat and is resistant to corrosion, third means in said tunnel for providing successive cascades over which the said solution can flow in a thin layer, fourth means for heating said solution flowing through said tunnel, said fourth means comprising a row of juxtaposed radiant gas burners made from a refractory material with a high radiating power, means for supplying a combustible gas to said burners; said burners being located sufficiently close to said tunnel and said solution so that the heat generated is sufficient to heat and vaporize said pre-concentrated solution by radiation, said burners being associated with means for adjusting the rate of flow of gas therethrough.

12. The apparatus according to claim 11, wherein said burners are positioned outside and below said tunnel.

13. The apparatus according to claim 11, wherein said burners are positioned inside said tunnel and above said solution and wherein a sheet of silica is positioned between the portion of said tunnel over which the solution is adapted to flow, and said said burners.

14. The apparatus according to claim 11, wherein an anti-convection metal grid is positioned over the face of said burners.

15. The apparatus according to claim 11, wherein said pre-concentration apparatus comprises a tower having at its base a compartment containing means for passing the pre-concentrated solution towards said tunnel and for passing the combustion gases from said burners towards the upper part of said tower.

16. The apparatus according to claim 11, wherein said tunnel comprises means for extracting and removing the vapours formed by heating the solution.

17. The apparatus according to claim 11 wherein said material which is a good conductor of heat and resistant to corrosion is Crystolon, Pyroflam, tantalum, niobium, silica glass.

18. The apparatus according to claim 11 wherein said means for providing successive cascades comprise a row of trays arranged at descending levels in the direction of solution flow.

19. The apparatus according to claim 18 wherein said trays are made of Crystolon, Pyroflam, tantalum, niobium, silica glass.

* * * * *